May 11, 1965   G. E. MORRISON   3,183,023
T PIPE FITTING
Filed Aug. 6, 1962

INVENTOR
GARNET EDMUND MORRISON
ATTORNEY

United States Patent Office 3,183,023
Patented May 11, 1965

3,183,023
T PIPE FITTING
Garnet Edmund Morrison, 293 Glen Forest Road,
Toronto, Ontario, Canada
Filed Aug. 6, 1962, Ser. No. 214,957
1 Claim. (Cl. 285—156)

This invention relates to a T pipe fitting and appertains to one of the saddle-type designed to be welded to a main pipe line.

An object of the invention is to provide a saddle-type T fitting capable of being welded into a main pipe line at any desired location and requiring only a minimum of welding.

A further object of the invention is to provide a T-shaped saddle fitting in such a manner that maximum and uniformity of flow are obtained between the fitting and the main pipe line.

A further object of the invention is to provide a specially reinforced saddle-type T fitting to provide greater strength where most needed at practically no extra cost. Formed welding elbows have been known and used for many years and in recent times manufactured or formed T's have been available. While the manufactured T has many good features its cost is high, it requires the carrying of too much stock, and its installation is also expensive.

I am aware that saddle fittings have been made heretofore but the known type of fitting invariably produces eddy flow through the fitting due to two primary reasons, namely the curvature of the inner surface of the T fitting is too abrupt and such surface does not merge in curve of sufficiently large radius into the inner wall of the pipe at the junction with the T fitting and thus destroys or breaks up stead flow of fluid through the main pipe line and branch pipe line connected to the T fitting.

Further, when shoulders are formed at the junction of the T fitting and the main pipe line, it may cause a vortex to be formed in the main pipe line and so impair the efficiency of flow of fluid through the pipe.

There also arises the difficulty of fabricating T fittings in various sizes since if the curvature of the inner surface of the T fitting and the surface of the inner wall of the main pipe is incorrect, then the efficiency of the T fitting becomes impaired.

In experiments with T saddle fittings, I have found that the radius of curvature of the inner face of the T fitting, and the radius of curvature of the outer face of the T fitting can bear a relationship to insure greater strength of the T fitting and provide an effective steady flow of fluid through the fitting to the main pipe line on which the T fitting is installed.

Moreover, my saddle T fitting requires less welding than does the manufactured T, yet provides the uniform curve from main to branch, with less line loss and greater ease of flow and both the manufacturing and installation costs are lower.

Although the strength of the fitting may be increased by added thickness in the area of the junction of the bore with the flange, I have found that significant reinforcing is gained by forming integral fins on the outside of the fitting.

According to my invention, a sufficient range of sizes of T saddle fitting can readily be fabricated and carried in stock to suit different standard sizes of pipes.

The various benefits which my improved T saddle fitting possesses are as follows:

The saddle T fabricated in accordance with my invention may be welded into a main pipe line at any location and it requires less welding than is necessary in installing manufactured T's.

Further, my improved saddle T fitting provides an uninterrupted curve from the main pipe to the T fitting without creating an area of discontinuity therebetween, and thus prevents pipe line loss of fluid flow and provides a greater ease of flow from the main line to a branch line or vice versa than is obtainable with other types of T saddle fittings.

There is the additional advantage that both maunfacturing and installation costs are greatly reduced over other similar types of T fittings.

Further, my improved saddle T fitting complies with all the requirements of the welding code and entails a minimum amount of welding in producing a perfectly formed approved welding branch or T connection between main pipes and branch pipes.

So that the nature of my invention will be thoroughly understood, I have illustrated an embodiment of the same which I shall describe in detail, but I wish it to be understood that I do not limit my invention to the precise dimensions disclosed in my specification but reserve the right to modify the same within the scope of my appended claim.

In the drawings.

Like characters of reference refer to like parts in the several figures of the drawing.

Figure 2:
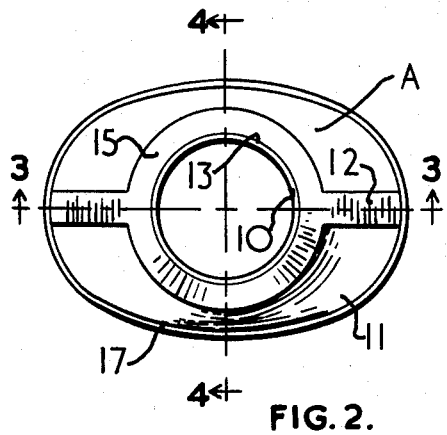
FIGURE 2 is a perspective view of my improved T saddle fitting.
Figure 1:
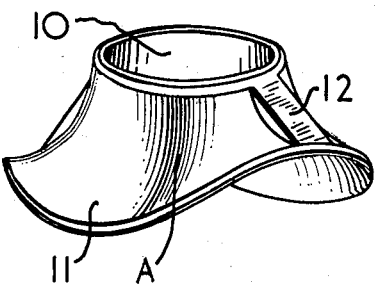
FIGURE 1 is a perspective view of my improved T saddle fitting.

Referring to the drawings, A represents my improved T saddle fitting in which 10 indicates the body of the fitting with a cylindrical bore and 11 indicates a flared flange on the lower end thereof. The inner peripheral wall of the bore in the body of the fitting is comparatively short being about one-half inch in the longitudinal direction of the pipeline (dimension $a$) while in the transverse direction the length of the bore is about one and one-half inches (dimension $b$). Thus the length of the bore is three times greater transversely than it is in the longitudinal direction of the pipeline. In other words, the flare of the lower end of the bore of the T fitting A, is much greater in the longitudinal direction than it is in the transverse direction. In FIGURE 2 it will be seen that the flared flange end 11 of the T-shaped fitting A appears elliptical in plan view.

Figures 3, 4:
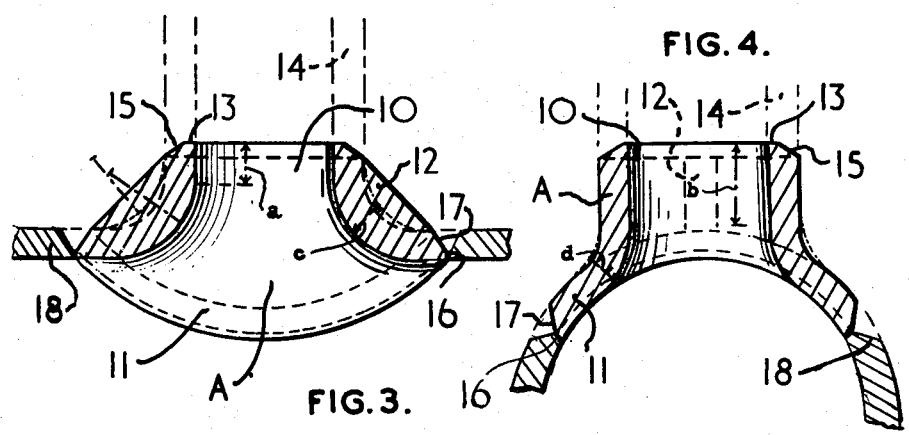
FIGURE 3 is a longitudinal section on the line 3—3 of FIGURE 2.
FIGURE 4 is a transverse section on the line 4—4 of FIGURE 2.

In the sectional views shown in FIGURES 3 and 4, the thickness of the fitting walls appears constant. However, in a normal size fitting where the wall thickness would be 5/16 inch, I prefer to thicken the fitting at the junction of the lower end of the bore 10 with the flared flange end 11 to approximately ½ inch on the longitudinal sides at location $c$ in FIGURE 3, but thinning off to approximately 3/8 inch on the transverse sides at location $d$ in FIGURE 4.

Thus, in a fitting having a general overall thickness of 5/16 inch, the thickness of the flange of the T fitting adjacent the bore of the fitting is increased to ½ inch at the longitudinal end of the flange and diminishes to 3/8 of an inch at the transverse portion of the flange.

Alternatively, the T pipe fitting for a pipeline may be described as follows: Consider line 3—3 of FIG. 2 as the major axis of the projection and line 4—4 as the minor axis. The first plane defines the cross section of FIG. 4 and the second plane defines the cross section of FIG 3. By establishing reference points, the relationships in the fitting can be defined. The longitudinal axis of the pipeline is parallel to the major axis of the projection. Thus, it may be said that the present saddle type T fitting for a pipeline has a transverse and longitudinal axis, the fitting having a body comprising an outlet section of cylindrical form with a bore therethrough defining an inner peripheral wall and an inlet section in the form of a flared throat section dependent from said outlet section, said flared throat section defining an arcuate plane having an orthographic projection in the form of an ellipse having a major and minor axis, said fitting adapted for attachment to a pipeline such that said major axis is parallel to said longitudinal axis of the pipeline, said outlet section and flared throat section having a substantially constant wall thickness except for the area of junction of the two sections, wherein a first plane lying normal to said major axis and parallel to said minor axis of said projection and a second plane lying normal to said minor axis and parallel to said major axis of said projection define respectively a first and second fitting cross-section, the length of the inner peripheral wall of the outlet section as measured in said second plane being less than the length of the inner peripheral wall as measured in said first plane and in the ratio of 1:3 thereby imparting a much greater flare to said fitting in the direction of the longitudinal axis of the pipeline than in the transverse axis, the wall thickness of each said cross-section being greatest in the area of the junction of the flared throat section and the cylindrical outlet section, the wall thickness at said junction in said second plane being greater than the wall thickness at said junction in said first plane, said constant wall thickness and the wall thicknesses at said junction in said second and first planes being in the approximate proportions of ⁵⁄₁₆, ½, ⅜ respectively, namely in the ratio of 5:8:6.

The strengthening of the longitudinal ends of the flared portion of the T fitting A is supplemented by a pair of aligned, diametrically opposite fins or webs 12 which are formed integral with the body and flange of the fitting, running upward in an incline from the margin of the flange to the upper end of the fitting. These fins or webs 12 are relatively thin and do not materially add to the weight of the T fitting although they materially strengthen the same in a critical area.

In pipeline construction, the greatest pressure is in the longitudinal direction of the pipe B, and thus the reinforcing of the T fitting in the longitudinal ends takes care of any additional strength required in the fitting without unduly increasing the weight or cost thereof.

The upper end of the T fitting A is provided with a plane narrow inner edge 13 which abuts with a similar and coplanar narrow inner edge of a contacting branch pipe 14 and the outer edge of the T fitting A and the outer edge of the abutting pipe are chamfered as shown at 15, each at an angle of approximately 30°, so forming a V-shaped recess at 60° into which the metallic welding is deposited.

Similarly, the peripheral edge of the flared flange is provided with a plane narrow edge 16 and the remainder 17 of the side wall of the flange is chamfered at approximately 30°.

The tolerance of fitting the flat peripheral edge 16 of the flange within a hole cut in the pipeline 18 is quite exact so that the T fitting is in frictional contact with the hole in the pipeline 18.

The complimentary chamfered edge of the flange of the T fitting and the chamfered edge of the hole in the pipeline 18 form a V-shaped recess of approximately 60° to receive the welding material by which the T-shaped saddle fitting A is secured to the pipe line 18.

To attain the mentioned ½ inch thickness of metal at the longitudinal end of the T fitting A (dimension $c$), the radius of curvature of the inner wall of the T fitting is approximately one inch, while the radius of curvature of the outer face of the T fitting at the longitudinal ends is 1¼ inches, that is a ratio of 4 to 5.

Irrespective of the dimension of the T-shaped fitting A, it will be observed that if the proper ratio of the inner curvature to the outer curvature is observed, it is not necessary to design each T fitting individually since observation of the ratio of curvature above indicated will give the required end linear strength to the fitting A and also provide a curved inner wall which will insure a steady flow of fluid through the T fitting.

What is claimed as new is:

A saddle-type T pipe fitting for a pipeline having a transverse and longitudinal axis, said fitting having a body comprising an outlet section of cylindrical form with a bore therethrough defining an inner peripheral wall and an inlet section in the form of a flared throat section dependent from said outlet section, said flared throat section defining an arcuate plane having an orthographic projection in the form of an ellipse having a major and minor axis, said fitting adapted for attachment to a pipeline such that said major axis is parallel to said longitudinal axis of the pipeline, said outlet section and flared throat section having a substantially constant wall thickness except for the area of junction of the two sections, wherein a first plane lying normal to said major axis and parallel to said minor axis of said projection and a second plane lying normal to said minor axis and parallel to said major axis of said projection define respectively a first and second fitting cross-section, the length of the inner peripheral wall of the outlet section as measured in said second plane being less than the length of the inner peripheral wall as measured in said first plane and in the ratio of 1:3 thereby imparting a much greater flare to said fitting in the direction of the longitudinal axis of the pipeline than in the transverse axis, the wall thickness of each said cross-section being greatest in the area of the junction of the flared throat section and the cylindrical outlet section, the wall thickness at said junction in said second plane being greater than the wall thickness at said junction in said first plane, said constant wall thickness and the wall thicknesses at said junction in said second and first planes being in the approximate proportions of ⁵⁄₁₆, ½, ⅜ respectively, namely in the ratio of 5:8:6.

References Cited by the Examiner
UNITED STATES PATENTS

| | | | |
|---|---|---|---|
| 2,157,274 | 5/39 | Williams | 285—156 |
| 2,670,224 | 2/54 | Markl | 285—156 |
| 2,788,232 | 4/57 | Stadthaus | 285—201 |
| 2,981,556 | 4/61 | Jackson | 285—286 X |

CARL W. TOMLIN, *Primary Examiner.*

THOMAS F. CALLAGHAN, *Examiner.*